(12) United States Patent
Liu et al.

(10) Patent No.: US 11,172,433 B2
(45) Date of Patent: Nov. 9, 2021

(54) NETWORK SEARCH DISPLAY METHOD FOR TERMINAL DEVICE, APPARATUS, AND TERMINAL DEVICE

(71) Applicant: Huawei Technologies Co., Ltd., Shenzhen (CN)

(72) Inventors: Xiaojian Liu, Wuhan (CN); Yinqing Jiang, Wuhan (CN); Bei Dai, Wuhan (CN); Zhe Li, Wuhan (CN); Haoping Guo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/341,594

(22) PCT Filed: Apr. 7, 2017

(86) PCT No.: PCT/CN2017/079642
§ 371 (c)(1),
(2) Date: Apr. 12, 2019

(87) PCT Pub. No.: WO2018/068483
PCT Pub. Date: Apr. 19, 2018

(65) Prior Publication Data
US 2019/0327667 A1 Oct. 24, 2019

(30) Foreign Application Priority Data
Oct. 13, 2016 (CN) .......................... 201610896029.1

(51) Int. Cl.
*H04W 48/16* (2009.01)
*G06F 3/14* (2006.01)
(Continued)

(52) U.S. Cl.
CPC .............. *H04W 48/16* (2013.01); *G06F 3/14* (2013.01); *H04M 1/724* (2021.01); *H04W 48/18* (2013.01); *H04W 88/06* (2013.01)

(58) Field of Classification Search
CPC ..... H04W 48/16; H04W 48/18; H04W 88/06; H04W 48/14; H04W 48/00; H04M 1/72519; G06F 3/14
See application file for complete search history.

(56) References Cited

U.S. PATENT DOCUMENTS 8,369,852 B2 2/2013 Buckley et al.
2007/0211669 A1 9/2007 Muatt et al.
(Continued)

FOREIGN PATENT DOCUMENTS

CN 101815346 A 8/2010
CN 103068009 A 4/2013
(Continued)

OTHER PUBLICATIONS

Machine Translation and Abstract of Chinese Publication No. CN103068009, Apr. 24, 2013, 15 pages.
(Continued)

*Primary Examiner* — Magdi Elhag
(74) *Attorney, Agent, or Firm* — Conley Rose, P.C.

(57) ABSTRACT

A network search display method for a terminal device and the terminal device, where the method includes obtaining, by the terminal device, a network search instruction instructing the terminal device to start searching for a network, searching, by the terminal device, a network frequency band in a first network standard for an available network according to the network search instruction, and displaying, by the terminal device to the user, the available network found in
(Continued)

the network frequency band in the first network standard. Hence, the method and the terminal device improve user experience.

20 Claims, 7 Drawing Sheets

(51) Int. Cl.
*H04M 1/724* (2021.01)
*H04W 48/18* (2009.01)
*H04W 88/06* (2009.01)

(56) References Cited

U.S. PATENT DOCUMENTS

| | | | |
|---|---|---|---|
| 2010/0216460 | A1 | 8/2010 | Wu |
| 2012/0190361 | A1 | 7/2012 | Shaikh et al. |
| 2014/0066061 | A1* | 3/2014 | Lou ............... H04W 48/16 455/434 |
| 2014/0256316 | A1* | 9/2014 | Lee ............... H04W 48/16 455/434 |
| 2015/0056985 | A1* | 2/2015 | Swaminathan ....... H04W 88/06 455/432.1 |
| 2016/0157161 | A1* | 6/2016 | Miao ............... H04W 8/22 455/434 |
| 2016/0183177 | A1 | 6/2016 | Ni et al. |
| 2016/0337946 | A1* | 11/2016 | Kim ............... H04W 8/183 |
| 2017/0156109 | A1 | 6/2017 | Uchikawa |
| 2018/0035365 | A1* | 2/2018 | Koratekere Honnappa ............... H04W 48/16 |
| 2018/0084487 | A1* | 3/2018 | Arumugam ....... H04W 48/16 |
| 2019/0335371 | A1* | 10/2019 | Shen ............ H04W 36/00837 |

FOREIGN PATENT DOCUMENTS

| | | |
|---|---|---|
| CN | 103561451 A | 2/2014 |
| CN | 104853409 A | 8/2015 |
| CN | 105611583 A | 5/2016 |
| CN | 105792323 A | 7/2016 |
| CN | 105828414 A | 8/2016 |
| JP | 2014011671 A | 1/2014 |

OTHER PUBLICATIONS

Machine Translation and Abstract of Chinese Publication No. CN103561451, Feb. 5, 2014, 21 pages.
Machine Translation and Abstract of Chinese Publication No. CN105611583, May 25, 2016, 11 pages.
Machine Translation and Abstract of Chinese Publication No. CN105828414, Aug. 3, 2016, 10 pages.
Foreign Communication From A Counterpart Application, PCT Application No. PCT/CN2017/079642, English Translation of International Search Report dated Jun. 13, 2017, 2 pages.
Foreign Communication From A Counterpart Application, PCT Application No. PCT/CN2017/079642, English Translation of Written Opinion dated Jun. 13, 2017, 3 pages.
Machine Translation and Abstract of Chinese Publication No. CN104853409, Aug. 19, 2015, 24 pages.
Foreign Communication From A Counterpart Application, Chinese Application No. 201780003345.4, Chinese Office Action dated Sep. 27, 2019, 4 pages.
Foreign Communication From A Counterpart Application, Chinese Application No. 201780003345.4, Chinese Search Report dated Sep. 16, 2019, 3 pages.
Foreign Communication From A Counterpart Application, European Application No. 17861096.0, Extended European Search Report dated Sep. 4, 2019, 8 pages.

* cited by examiner

NETWORK SEARCH DISPLAY METHOD FOR TERMINAL DEVICE, APPARATUS, AND TERMINAL DEVICE

CROSS-REFERENCE TO RELATED APPLICATIONS

This application is a U.S. National Stage of International Patent Application No. PCT/CN2017/079642 filed on Apr. 7, 2017, which claims priority to Chinese Patent Application No. 201610896029.1 filed on Oct. 13, 2016. Both of the aforementioned applications are hereby incorporated by reference in their entireties.

TECHNICAL FIELD

This application relates to the terminal field, and in particular, to a network search display method for a terminal device and the terminal device in the terminal field.

BACKGROUND

In a scenario in which a terminal device retrieves a network, the terminal device needs to search for a cell and resides in a found suitable cell. With development of communications technologies, the terminal device supports more technical standards. In a Long Term Evolution (Long Term Evolution. LTE) phase, the terminal device needs to search full frequency bands of 4G, 3G, and 2G, and a network search time is relatively long. Consequently, user experience is poor.

SUMMARY

In view of this, embodiments of this application provide a network search display method for a terminal device and the terminal device, so as to improve user experience.

According to a first aspect, a network search display method for a terminal device is provided, where the method includes: obtaining, by the terminal device, a network search instruction that is used to instruct the terminal device to start searching for a network; searching, by the terminal device, a network frequency band in a first network standard for an available network according to the network search instruction; and displaying, by the terminal device to the user, the available network found in the network frequency band in the first network standard.

Some found available networks are first displayed to the user in a network search process, so that a waiting time of the user can be shortened, so as to improve user experience.

Optionally, the network frequency band in the first network standard is a network frequency band supported in an area in which the terminal device is located. Alternatively, the network frequency band in the first network standard may be a network frequency band in a cloud communications database, where the cloud communications database may include country code, mobile network code, and corresponding network frequency band information.

Optionally, an embodiment of this application may be applied to a manual network search scenario, including a scenario in which when the terminal device is powered on, a network needs to be manually searched for and the terminal device switches from having no service to retrieving a network.

In a possible implementation, after the searching, by the terminal device, a network frequency band in a first network standard for an available network according to the network search instruction, the method further includes: searching, by the terminal device, a network frequency band in a second network standard for an available network; and displaying, by the terminal device to the user, the available network found in the network frequency band in the second network standard.

Optionally, the method further includes: sequentially searching, by the terminal device, for available network frequency bands in the plurality of standards in descending order of priorities of the plurality of standards. That is, a priority of the first network standard is higher than a priority of the second network standard.

The terminal device may search for a network according to priorities of standards and report the network according to the priorities of the standards, so as to greatly improve user experience.

Optionally, after finding an available network in a first phase, the terminal device may stop searching another network frequency band, thereby reducing power consumption of the terminal.

In a possible implementation, the searching, by the terminal device, a network frequency band in a first network standard for an available network according to the network search instruction includes: searching, by the terminal device, the network frequency band in the first network standard for the available network in a pre-configured first time interval according to the network search instruction.

Optionally, the terminal device may search network frequency bands in different standards of different operators in the pre-configured first time interval, that is, the terminal device may not search a network frequency band in a single standard in the first time interval.

In a possible implementation, the terminal device may be configured to display N available networks to the user each time finding the N available networks.

According to a second aspect, a terminal device is provided, configured to perform the method according to any one of the first aspect or the possible implementations of the first aspect. Specifically, the terminal device may include units configured to perform the method according to any one of the first aspect or the possible implementations of the first aspect.

According to a third aspect, a terminal device is provided, including a memory, a processor, and a display, where the memory is configured to store a computer program, and the processor is configured to invoke and run the computer program from the memory, and when the program is run, the processor performs the method according to any one of the first aspect or the possible implementations of the first aspect.

According to a fourth aspect, a computer readable medium is provided, configured to store a computer program including an instruction used to perform the method according to any one of the first aspect or the possible implementations of the first aspect.

These aspects or other aspects of this application are clearer and more comprehensible in descriptions of the following embodiments.

DESCRIPTION OF EMBODIMENTS

Figure 1:
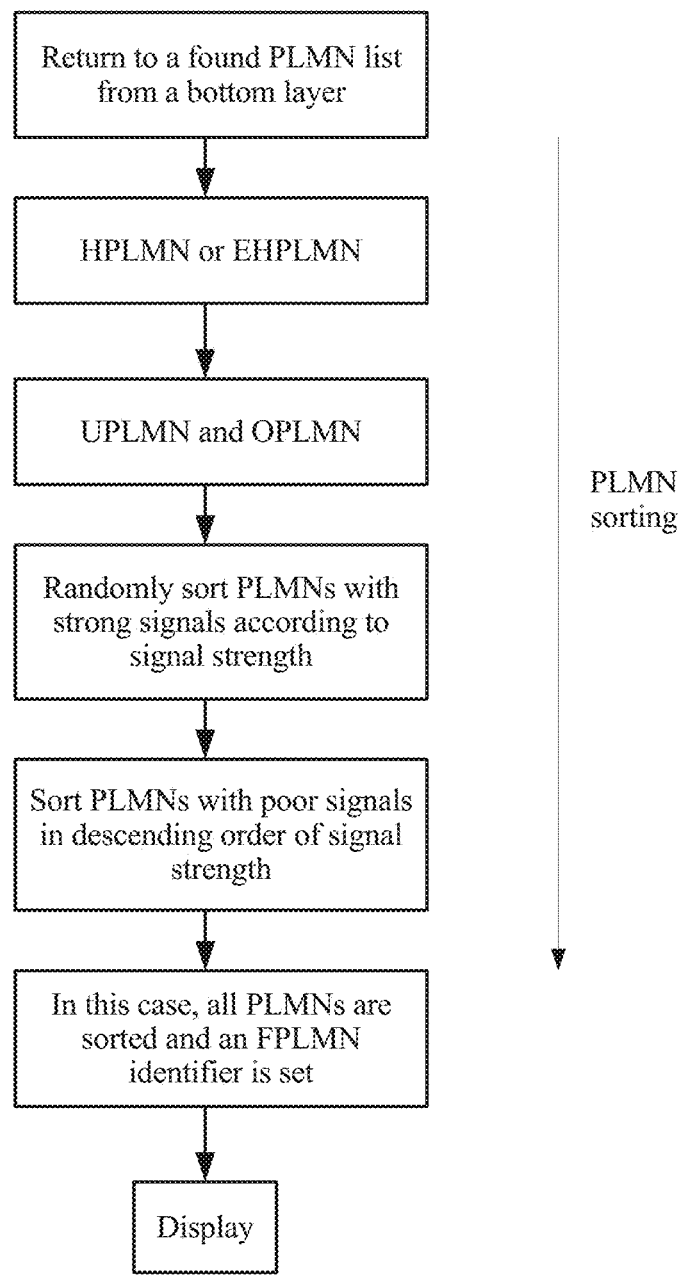
FIG. 1 is a schematic diagram of priorities of searching for public land mobile networks PLMNs.

The following clearly and completely describes the technical solutions of the embodiments of this application with reference to the accompanying drawings in the embodiments of this application. In should be noted that the embodiments in this application and the features in the embodiments may be mutually combined in the case of no conflict.

It should be understood that the specific embodiments described herein are merely used to explain this application but are not intended to limit this application.

The technical solutions of the embodiments of this application may be applied to various communications systems, such as: a Global System for Mobile Communications (Global System for Mobile Communications, GSM), a Code Division Multiple Access (Code Division Multiple Access. CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), a Worldwide Interoperability for Microwave Access (Worldwide Interoperability for Microwave Access, WiMAX) communications system, and a future 5G system.

Particularly, the technical solutions of the embodiments of this application may be applied to various communications systems that are based on a non-orthogonal multiple access technology, for example, a sparse code multiple access (Sparse Code Multiple Access, SCMA) system and a low density signature (Low Density Signature, LDS) system. Certainly, the SCMA system and the LDS system may also be referred to as other names in the communications field. Further, the technical solutions of the embodiments of this application may be applied to a multi-carrier transmission system that uses the non-orthogonal multiple access technology, for example, orthogonal frequency division multiplexing (Orthogonal Frequency Division Multiplexing, OFDM), filter bank multicarrier (Filter Bank Multi-Carrier. FBMC), generalized frequency division multiplexing (Generalized Frequency Division Multiplexing, GFDM), and filtered orthogonal frequency division multiplexing (Filtered-OFDM, F-OFDM) systems that use the non-orthogonal multiple access technology.

A terminal device in the embodiments of this application may be implemented in various forms. For example, the terminal device in the embodiments of this application may be user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device that has a wireless communication function, a computing device, or another processing device connected to a wireless modem, an in-vehicle device, a wearable device, a terminal device in a future 5G network, a terminal device in a future evolved public land mobile network (Public Land Mobile Network, PLMN), or the like. This is not limited in the embodiments of this application.

When a terminal is powered on or disconnected from a network, the terminal first selects a public land mobile network (Public Land Mobile Network, PLMN), and then searches for a cell in the PLMN. If the terminal cannot capture a suitable cell in the PLMN, the terminal reports a PLMN list to start a new round of cell obtaining process. The terminal needs to maintain different types of PLMN lists, and each list includes a plurality of PLMNs. For details, refer to Section 4.3 in the 3GPP 23.122 protocol. As shown in FIG. 1, different types of PLMNs have different priorities. An HPLMN is a PLMN to which a terminal user belongs; an EHPLMN is a PLMN that is in a same position as a PLMN currently selected by the terminal and has a same priority as the PLMN currently selected by the terminal; a UPLMN is a parameter that is related to PLMN selection and that is stored in a USIM card; and an OPLMN is a parameter that is related to PLMN selection and that is stored in the USIM card.

A mobile terminal usually may register with a mobile communications network automatically or manually. In the manual network search mode, when the terminal is powered on or disconnected from a network, a non-access stratum function module of the terminal instructs an access stratum to search for all PLMNs, then the access stratum reports information about all found PLMNs to the non-access stratum, and a user manually selects a PLMN. A subsequent cell selection and re-selection process is the same as an automatic selection process.

Figure 2:
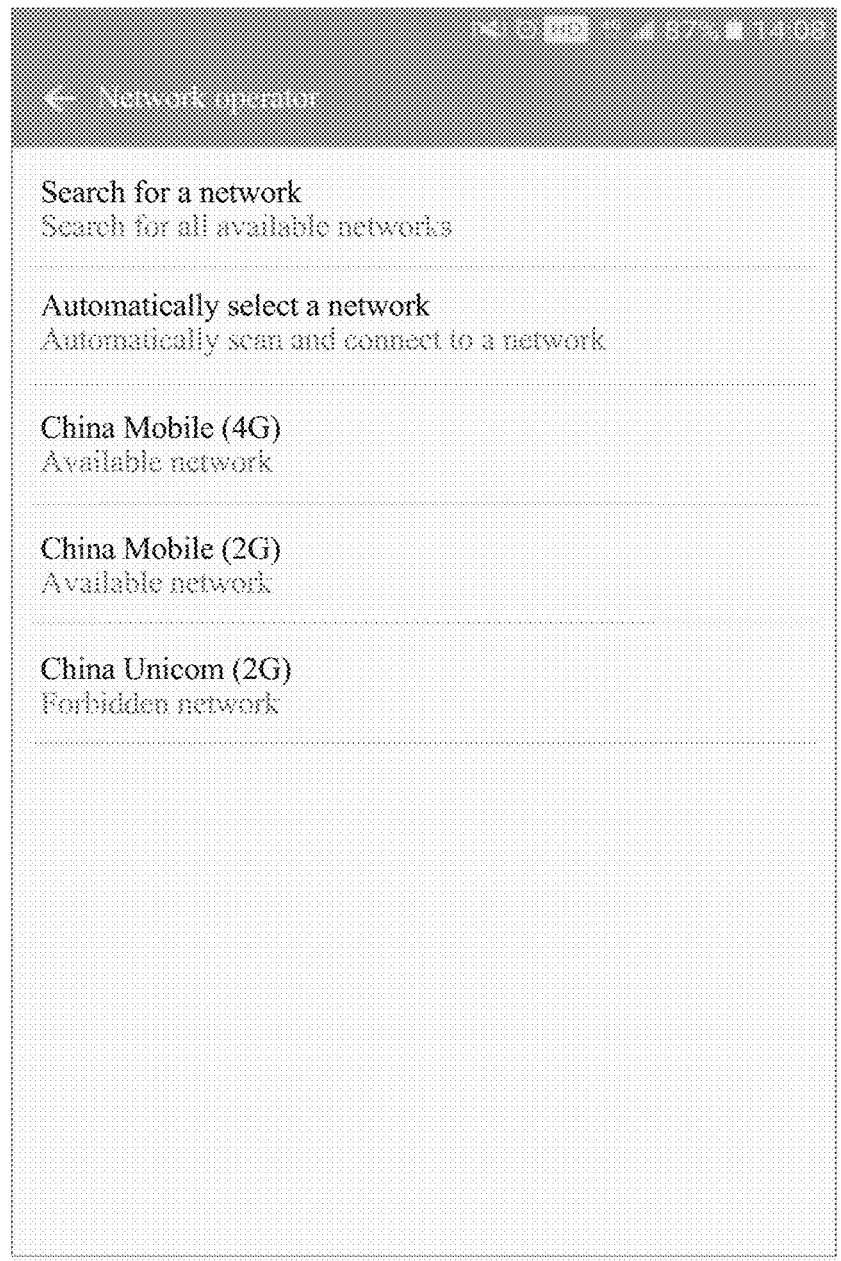
FIG. 2 shows a display screen displaying a manual network search of a terminal device applicable to an embodiment of this application.

After the user selects the manual network search mode, the terminal device searches for a network in a current environment, and displays the network on a screen. As shown in FIG. 2, FIG. 2 shows a display screen displaying a manual network search according to an embodiment of this application. Specifically, the user may select a network search option on the screen in FIG. 2, that is, select the manual network search mode. After the user waits for a period of time, the screen displays a network available to the terminal device, such as China Mobile 4G, China Mobile 2G, and China Unicom 2G in FIG. 2. The user may select one available network for registration.

Figure 3:
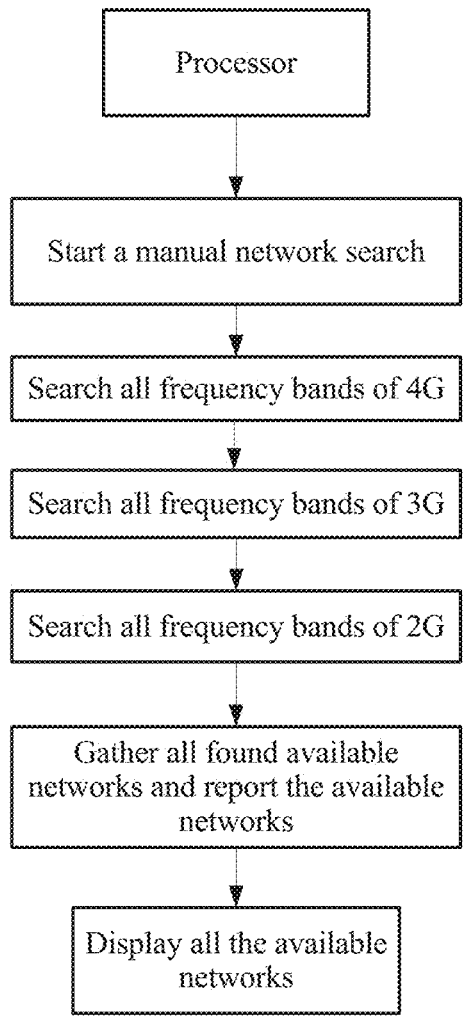
FIG. 3 is a schematic flowchart of a network search display method for a terminal device in the prior art.

A commonly used technology for a terminal to access a network includes a $4^{th}$ Generation (4G) mobile communications technology, a $3^{rd}$ Generation (3G) mobile communications technology, a $2^{nd}$ Generation (2G) mobile communications technology, and the like. As shown in FIG. 3, a manual network search process of the terminal device is usually as follows: An application processor sends a manual network search instruction to a baseband processor, and the baseband processor may first search for 4G, then search for 3G, and finally search for 2G, and then gather found available networks and display the available networks to the user. The baseband processor spends approximately 50 s searching 19 frequency bands of 4G; spends approximately 20 s searching five frequency bands of 3G; and spends approximately 6 s searching four frequency bands of 2G. Approximately 76 s are required in total. With development of mobile communications technologies, a new access technology emerges subsequently, such as 5G, and operators have more frequency bands. Therefore, a waiting time of the user becomes longer, thereby resulting in poor user experience.

Figure 4:
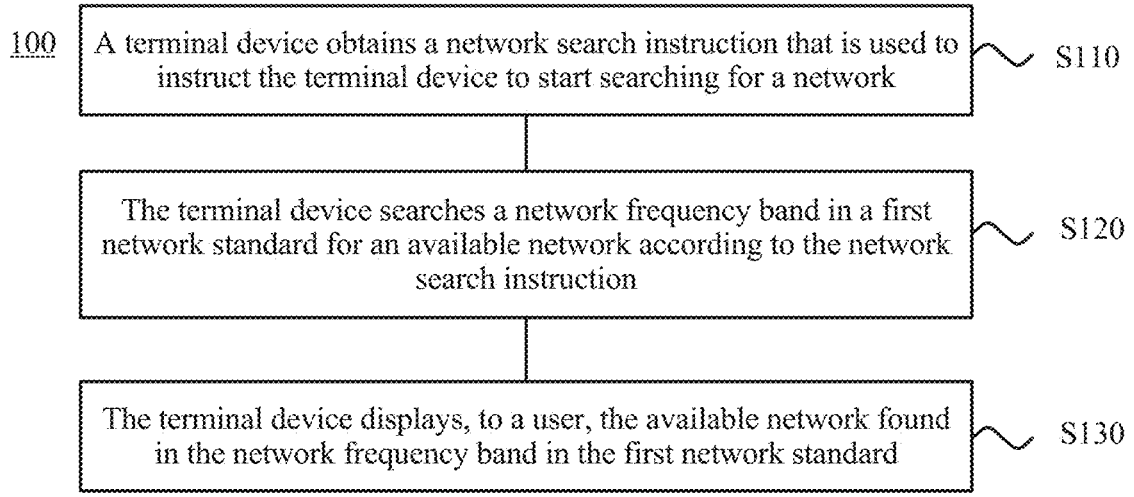
FIG. 4 is a schematic flowchart of a network search display method for a terminal device according to an embodiment of this application.

FIG. 4 shows a schematic block diagram of a network search display method 100 for a terminal device according to an embodiment of this application. As shown in FIG. 4, the method 100 may be performed by the terminal device, for example, may be performed by a mobile terminal. The method 100 includes the following steps.

S110. The terminal device obtains a network search instruction that is used to instruct the terminal device to start searching for a network.

S120. The terminal device searches a network frequency band in a first network standard for an available network according to the network search instruction.

S130. The terminal device displays, to the user, the available network found in the network frequency band in the first network standard.

Specifically, when the terminal device is powered on or retrieves a network, the terminal device may first obtain the network search instruction. Specifically, the terminal device may receive the network search instruction entered by user equipment, for example, enable a network search option shown in FIG. 1. If a terminal device has no independent manual network search option, the terminal device may disable an automatic network search option, to obtain the network search instruction in this embodiment of this application. After obtaining the network search instruction, the terminal device may immediately search a network frequency band in a network standard, and immediately display a search result to the user after completing searching the network frequency band. In an entire network search process, the terminal device may sequentially display, to the user, results found in network frequency bands in different network standards. For example, the terminal device may first search for a 4G network, and display a found result to the user in a timely manner after completing searching for the 4G network. As shown in FIG. 1, the screen may first display the 4G network. Then the terminal device subsequently searches for a 3G network, and if no available 3G network is found, the terminal device may display no available 3G network on the screen. Finally the terminal device searches for a 2G network, and if an available 2G network is found, the terminal device may display the available 2G network on the screen.

It should be understood that, in this embodiment of this application, the terminal device may first search some network frequency bands, and display an available network in the network frequency bands to the user. That is, the terminal device may first search all network frequency bands in a same network standard, and display an available network in the network standard to the user; or may first search a combination of different network standards of different operators, for example, the terminal device may first search all frequency bands of China Mobile 4G and China Unicom 3G, and display a found available network to the user. This is not limited in this embodiment of this application.

Therefore, according to the network search display method for a terminal device provided in this embodiment of this application, some found available networks are first displayed to the user in a network search process, so that a waiting time of the user can be shortened, so as to improve user experience.

It should be further understood that, if the terminal device does not find an available network in a network frequency band in a network standard, the terminal device may remind, in a manner of vibration, a ringtone, or the like, the user that no available network is found in this phase. This is not limited in this embodiment of this application.

Optionally, in this embodiment of this application, after the searching, by the terminal device, a network frequency band in a first network standard for an available network according to the network search instruction, the method further includes: searching, by the terminal device, a network frequency band in a second network standard for an available network; and displaying, by the terminal device to the user, the available network found in the network frequency band in the second network standard.

Optionally, the network frequency band in the first network standard is a network frequency band supported in an area in which the terminal device is located.

Figure 5:
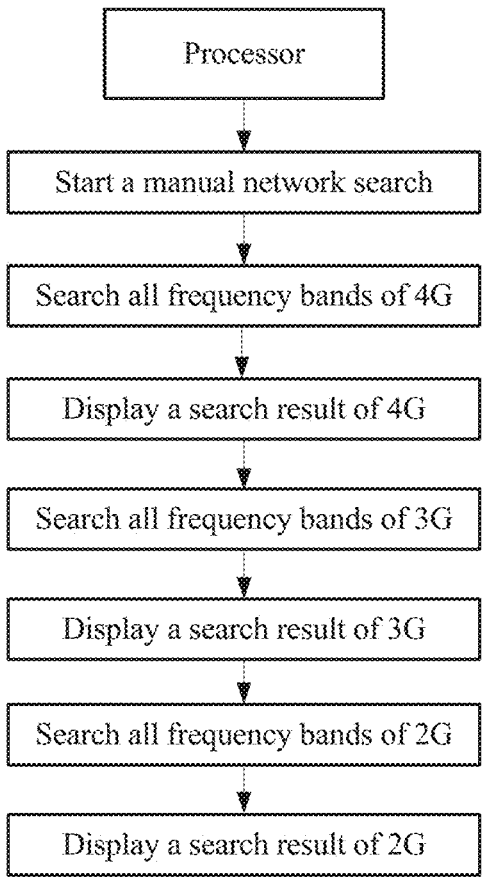
FIG. 5 is a schematic flowchart of a network search display method for a terminal device according to an embodiment of this application.

Specifically, the terminal device may classify all network frequency bands in a current environment into a plurality of phases for search and display. For example, division may be performed according to a network standard. As shown in FIG. 5, if the current environment includes 19 frequency bands included in the 4G network, five frequency bands included in the 3G network, and four frequency bands included in the 2G network, after obtaining the network search command, the terminal device may first search, in a first phase, the 19 frequency bands included in the 4G network. If an available network is found, the terminal device may directly display the available network on the screen. The terminal device may search, in a second phase, the five frequency bands included in the 3G network after displaying a search status of the 4G network to the user; or the terminal device may search the five frequency bands included in the 3G network after completing searching the 4G network but before displaying a search status of the 4G network to the user; or the terminal device may search the five frequency bands included in the 3G network at the same time when displaying a search status of the 4G network to the user. It should be understood that, in this embodiment of this application, whether to first display a search result in a previous phase to the user or first start a search in a next phase is not limited.

With development of communications technologies, the communications industry develops from $1^{st}$ Generation (1G) to current flourishing $4^{th}$ Generation (4G) or even $5^{th}$ Generation (5G) that is widely discussed at present, so that network standards of operators constantly increase. The following Table I may be used to briefly understand development of China's network standards and corresponding frequency bands. Compared with a $1^{st}$ Generation (1G) analog standard mobile phone and a 2nd Generation (2G) digital mobile phone such as GSM, 3G/4G combines wireless communication with multimedia communication such as the Internet, so as to process various media forms such as an image, music, and a video stream more conveniently and quickly, and provide various information services that include web browsing, a conference call, e-commerce, and the like.

TABLE 1

| 1G | 2G | | 3G | | 4G | |
|---|---|---|---|---|---|---|
| Use an analog mobile network, for example, a "cellular phone". | Mobile and Unicom: GSM | Frequency band: 900 MHz/ 1800 MHz/ 1900 MHz | Mobile: TD-SCDMA | Frequency band: 1880 MHz to 1900 MHz and 2010 MHz to 2025 MHz | Mobile: TDD-LTE | Frequency band: 1880 MHz to 1900 MHz, 2320 MHz to 2370 MHz, and 2575 MHz to 2635 MHz |
| | | | Unicom: WCDMA | Frequency band: 1920 MHz to 1935 MHz and 2110 MHz to 2125 MHz | Unicom: FDD-LTE | Frequency band: 2300 MHz to 2320 MHz 2555 MHz to 2575 MHz |
| | Telecom: CDMA | Frequency band: 800 MHz | Telecom: CDMA2000 | Frequency band: 1940 MHz to 1955 MHz and 2130 MHz to 2145 MHz | Telecom: TDD-LTE | Frequency band: 1765 MHz to 1780 MHz and 1860 MHz to 1875 MHz |

Optionally, the terminal device may start a search in the second phase only PGP-T if a network available to the terminal device is not found in the first phase. That is, the terminal device may no longer perform a subsequent search if a network frequency band available to the terminal device is found in the first phase, so that the user can directly select the available network found in the first phase for registration.

Optionally, in this embodiment of this application, the network frequency band supported in the area in which the terminal device is located includes network frequency bands in a plurality of network standards. The first network standard is a network standard with a highest priority in the plurality of network standards. That is, the terminal device may first search a network frequency band in the network standard with the highest priority in the existing network standards supported in the area in which the terminal device is located. For example, for a current technology, the network standard with the highest priority may be 4G, and for a subsequent technology, the network standard with the highest priority may be 5G or the like. The second network standard may be a network standard with a second highest priority, for example, may be 3G. That is, the terminal device may search for available networks according to priorities of network standards, and sequentially display results found in different network standards.

Optionally, in this embodiment of this application, the searching, by the terminal device, a network frequency band in a first network standard for an available network according to the network search instruction includes: searching, by the terminal device, the network frequency band in the first network standard for the available network in a pre-configured first time interval according to the network search instruction.

Figure 6:
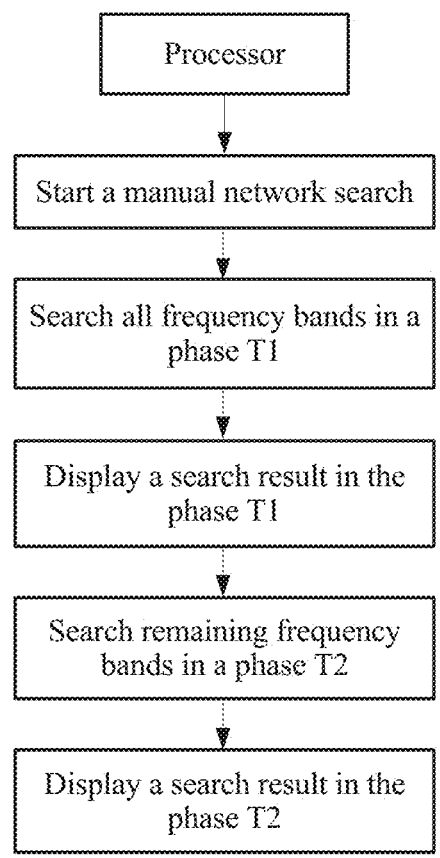
FIG. 6 is another schematic flowchart of a network search display method for a terminal device according to an embodiment of this application.

Specifically, the terminal device may further search for a network in phases by configuring an upper network search time limit. As shown in FIG. 6, after obtaining the network search instruction, the terminal device may first search all network frequency bands in a time period T1; when T1 expires, report an available network found in the time period T1, then search remaining network frequency bands in a time period T2; and when T2 expires, report an available network found in the time period T2. For example, if a time required for searching all the frequency bands by the terminal device in a current environment is 2 min, a network search time in a first phase may be set to 0.5 min. That is, after receiving a manual network search command, the terminal device may search all the frequency bands for a network, and when 0.5 min expires, display, to the user, an available network found in 0.5 min. In addition, the terminal device may distinguish a network frequency band that is searched from a network frequency band that is not searched. In a second phase, the terminal device may search, for a network, the frequency band that is not searched in the first phase. Likewise, when 0.5 min expires, the terminal device may display, to the user, an available network found in 0.5 min in the second phase. Optionally, the terminal device may search the network frequency band in the first network standard in the first time interval, and display a search result in the first network standard to the user when the first time interval expires.

It should be understood that the terminal device may further first record a found available network, and display the recorded available network to the user when the configured upper time limit is reached. For example, the terminal device may first store an available network found in each 0.5 min. It is assumed that an upper reporting time limit is set to 0.8 min, and the terminal device reports, after 0.8 min, the available network found in previous 0.5 min. That is, a network search time interval of the terminal device may be or may be not related to a reporting time interval.

Optionally, in this embodiment of this application, the terminal device may further query a cloud communications database to obtain country code and corresponding frequency band information that are of the area in which the terminal device is located, and then perform a search in phases and report found results.

Figure 7:
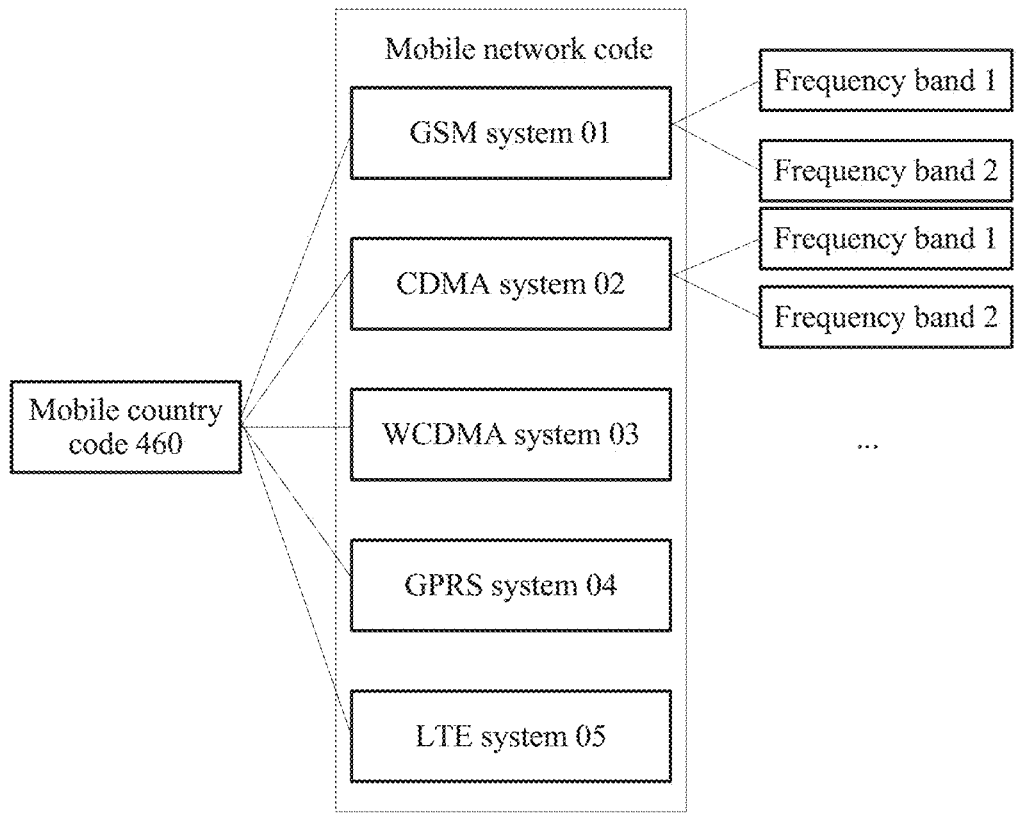
FIG. 7 shows a specific format of a cloud communications database according to an embodiment of this application.

Currently, the whole world uses an international mobile subscriber identity (international mobile subscriber identity, IMSI) to identify a user. The IMSI mainly includes mobile country code (Mobile Country Code, MCC), mobile network code (Mobile Network Code, MNC), and a mobile subscriber identification number (Mobile Subscriber Identification Number. MSIN). The cloud communications database in this embodiment of this application may include country code, mobile network code, and corresponding network frequency band information. China is used as an example. A specific format of the cloud communications database is shown in FIG. 7. All resources of the MCC are allocated and managed by the International Telecommunication Union, and the MCC is used to uniquely identify a country to which a mobile subscriber belongs, and has three digits in total. For example, 460 represents China, 450 represents Korea, and 470 represents Bangladesh. The MNC has two digits in total, which are used to represent different communications systems. For example, 01 is used for a GSM system, 02 is used for a CDMA system, 03 is used for a WCDMA system, 04 is used for a GPRS system, and 05 is used for an LTE system. In the cloud communications database, different pieces of mobile network code are corresponding to at least one network frequency band. Specifically, after obtaining the network search instruction, the terminal device may query the cloud communications database, and search, for a network, a network frequency band corresponding to different pieces of mobile network code that are corresponding to local country code. After finding an available network, the terminal device may immediately display the available network to the user, that is, each time the terminal device finds an available network in the cloud communications database, the terminal device immediately displays the available network to the user. In addition, the terminal device may obtain, by using a Global Positioning System (Global Positioning System, GPS) of the terminal device, a geographic location at which the terminal device is located, and query the cloud communications database with reference to the geographic location.

It should be understood that, in this embodiment of this application, network frequency bands in the cloud communications database may be optimal frequency bands corresponding to different mobile networks of different countries.

It should be understood that the terminal device may be further implemented by using the cloud communications database with reference to the foregoing phased search solution. This is not limited in this embodiment of this application.

It should be further understood that this embodiment of this application is described by using 4G, 3G, and 2G as examples. In a frequency band of subsequent 5G or another operator, the network search display method for a terminal device in this embodiment of this application may be used provided that the terminal device can implement a manual network search function, so as to improve user experience.

It should be further understood that, in this embodiment of this application, a phased search may be implemented in a plurality of manners. For example, a solution for setting an upper time limit may be implemented by using a timer.

It should be understood that sequence numbers of the foregoing processes do not mean execution sequences. The execution sequences of the processes should be determined according to functions and internal logic of the processes, and should not be construed as any limitation on the implementation processes of this embodiment of this application.

Although this application and advantages of this application have been described in detail, it should be understood that this application may be changed, substituted, and modified without departing from the spirit and scope of this application as defined in the appended claims.

Figure 8:
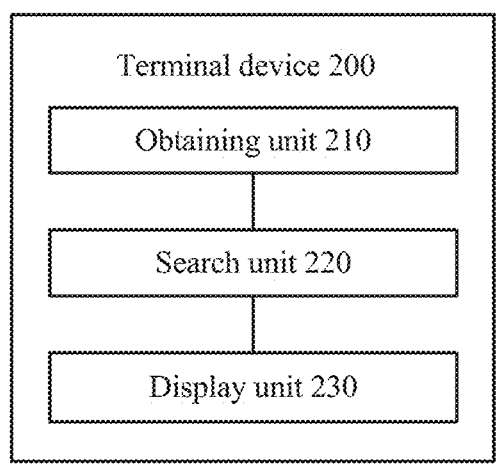
FIG. 8 is a schematic block diagram of a terminal device according to an embodiment of this application.

FIG. 8 shows a schematic block diagram of a terminal device 200 according to an embodiment of this application. As shown in FIG. 8, the terminal device 200 includes:

an obtaining unit 210, configured to obtain a network search instruction that is used to instruct the terminal device to start searching for a network;

a search unit 220, configured to search a network frequency band in a first network standard for an available network according to the network search instruction; and a display unit 230, configured to display, to a user, the available network found in the network frequency band in the first network standard.

Therefore, the terminal device in this embodiment of this application first displays some found available networks to the user in a network search process, so that a waiting time of the user can be shortened, so as to improve user experience.

Optionally, the terminal device in this embodiment of this application includes but is not limited to a mobile phone, a tablet, a computer, a multimedia player, and a game console. All devices that use a mobile communications network are within the protection scope of this embodiment of this application provided that the devices support a network search function.

Optionally, in this embodiment of this application, the search unit 220 is further configured to search a network frequency band in a second network standard for an available network; and the display unit 230 is further configured to display, to the user, the available network found in the network frequency band in the second network standard.

Optionally, in this embodiment of this application, the network frequency band in the first network standard is a network frequency band supported in an area in which the terminal device is located.

Optionally, in this embodiment of this application, the first network standard is a network standard with a highest priority.

Optionally, in this embodiment of this application, the search unit 220 is specifically configured to search the network frequency band in the first network standard for the available network in a pre-configured first time interval according to the network search instruction.

The terminal device 200 in this embodiment of this application may be corresponding to the terminal device in the method embodiment of this application. In addition, the foregoing and other operations and/or functions of the modules in the terminal device 200 are separately used to implement a corresponding procedure of the method 100 in FIG. 4. For brevity, details are not described herein.

Figure 9:
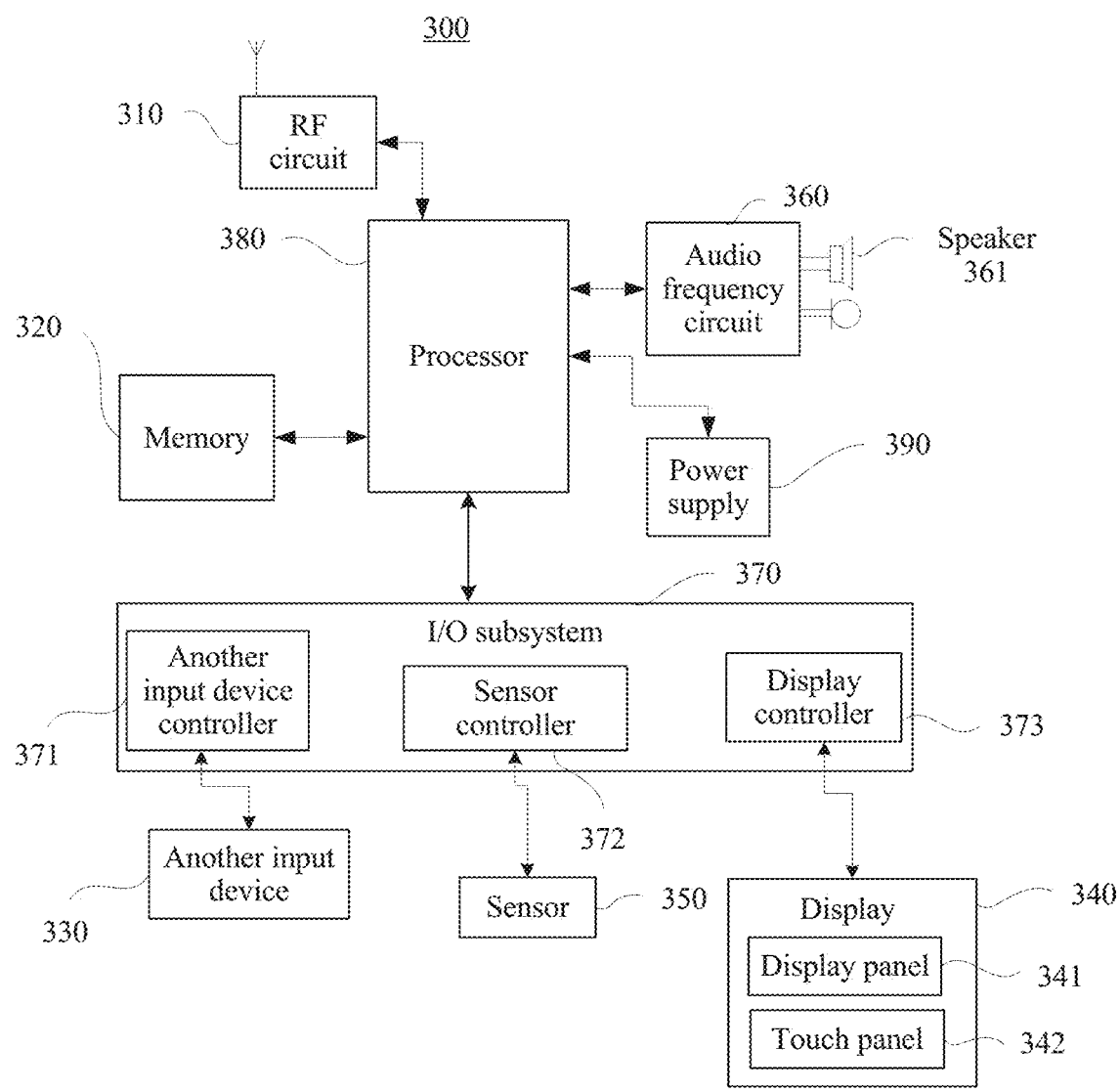
FIG. 9 is another schematic block diagram of a terminal device according to an embodiment of this application.

FIG. 9 is another schematic block diagram of a terminal device according to an embodiment of this application. The terminal device 300 shown in FIG. 9 includes components such as a radio frequency (Radio Frequency, RF) circuit 310, a memory 320, another input device 330, a display 340, a sensor 350, an audio frequency circuit 360, an I/O subsystem 370, a processor 380, and a power supply 390. A person skilled in the art may understand that a structure of the terminal device shown in FIG. 5 constitutes no limitation on the terminal device, and the terminal device may include more or fewer parts than those shown in the figure, or combine some parts, or split some parts, or have different part arrangements. A person skilled in the art may understand that the display 140 belongs to a user interface (User Interface, UI), and the terminal device 300 may include more or fewer user interfaces than those shown in the figure.

The following describes each composition part of the terminal device 300 in detail with reference to FIG. 9.

The RF circuit 310 may be configured to: receive and send a signal in an information receiving/transmitting process or a call process, and in particular, after receiving downlink information from a base station, send the downlink information to the processor 380 for processing; and in addition, send designed uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 310 may communicate with a network and another device through wireless communication. The wireless communication may use any communications standard or protocol, including but not limited to a Global System for Mobile Communications (Global System for Mobile Communications, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Message Service, SMS), and the like.

The memory 320 may be configured to store a software program and a module, and the processor 380 performs various function applications of the terminal device 300 and data processing by running the software program and the module stored in the memory 320. The memory 320 may mainly include a program storage area and a data storage area. The program storage area may store an operating system, an application program required by at least one function (such as a sound playing function or an image playing function), and the like; and the data storage area may store data (such as audio data or an address book) created according to use of the terminal device 300, and the like. In addition, the memory 320 may include a high-speed random access memory, or may include a nonvolatile memory, such as at least one magnetic disk storage device, a flash device, or another volatile solid-state storage device.

The another input device 330 may be configured to receive input number or character information, and generate key signal input related to user setting and function control of the terminal device 300. Specifically, the another input device 330 may include but is not limited to one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), or the like. The another input device 330 is connected to another input device controller 371 of the I/O subsystem 370, and performs signal exchange with the processor 380 under control of the another input device controller 371.

The display 340 may be configured to display information entered by a user or information provided for a user, and various menus of the terminal device 300, and may further receive user input. Specifically, the display 340 may include a display panel 341 and a touch panel 342. The display panel 341 may be configured in a form, such as a liquid crystal display (Liquid Crystal Display, LCD) or an organic light-emitting diode (Organic Light-Emitting Diode, OLED). The touch panel 342, also referred to as a touchscreen, a touch-sensitive screen, or the like, may collect a touch or non-touch operation (for example, an operation performed by the user on the touch panel 342 or near the touch panel 342 by using any proper object or accessory, such as a finger or a stylus, or a motion sensing operation, where the operation includes operation types such as a single-point control operation and a multipoint control operation) of the user on or near the touch panel 342, and drive a corresponding connection apparatus according to a preset program. Optionally, the touch panel 342 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, then sends the information to the processor 380, and can receive and execute a command sent by the processor 380. In addition, the touch panel 342 may be implemented in a plurality of types, such as a resistive type, a capacitive type, infrared, and a surface acoustic wave, or the touch panel 342 may be implemented by using any technology developed in the future. Further, the touch panel 342 may cover the display panel 341. The user may perform, according to content displayed on the display panel 341 (the displayed content includes but is not limited to a soft keyboard, a virtual mouse, a virtual key, an icon, and the like), an operation on or near the touch panel 342 that covers the display panel 341. After detecting the operation on or near the touch panel 342, the touch panel 342 sends the operation to the processor 380 by using the I/O subsystem 370 to determine the user input, and then the processor 380 provides, according to the user input, corresponding visual output on the display panel 341 by using the I/O subsystem 370. In FIG. 5, the touch panel 342 and the display panel 341 serve as two independent parts to implement input and input functions of the terminal device 300; however, in some embodiments, the touch panel 342 and the display panel 341 may be integrated to implement the input and output functions of the terminal device 300.

The terminal device 300 may further include at least one sensor 350, such as a light sensor, a motion sensor, and another sensor. Specifically, the light sensor may include an ambient light sensor and a proximity sensor. The ambient light sensor may adjust brightness of the display pane 341 according to luminance of ambient light, and the proximity sensor may disable the display panel 341 and/or backlight when the terminal device 300 approaches an ear. As a motion sensor, an accelerometer sensor may detect a value of acceleration in each direction (generally, three axes), may detect a value and a direction of gravity in a static state, and may be used in an application that recognizes a mobile phone posture (such as screen switching between a landscape mode and a portrait mode, a related game, and magnetometer posture calibration), a function related to vibration identification (such as a pedometer and a strike), and the like. Other sensors such as a gyroscope, a barometer, a hygrometer, a thermometer, and an infrared sensor may be further configured in the terminal device 300, and details are not described herein.

The audio frequency circuit 360, a speaker 361, and a microphone 362 may provide an audio interface between the user and the terminal device 300. The audio frequency circuit 360 may convert received audio data into a signal, and transmit the signal to the speaker 361, and the speaker 361 converts the signal into a voice signal for output. In addition, the microphone 362 converts a collected voice signal into a signal, and the audio frequency circuit 360 receives the signal, converts the signal into audio data, and then outputs the audio data to the RF circuit 310, so as to send the audio data to, for example, another mobile phone, or output the audio data to the memory 320 for further processing.

The I/O subsystem 370 is configured to control an input/output external device, and may include the another input device controller 371, a sensor controller 372, and a display controller 373. Optionally, one or more other input control device controllers 371 receive a signal from the another input device 330 and/or send a signal to the another input device 330. The another input device 330 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input control device controller 371 may be connected to any one or more of the foregoing devices. The display controller 373 in the I/O subsystem 370 receives a signal from the display 340 and/or sends a signal to the display 340. After the display 340 detects user input, the display controller 373 converts the detected user input into interaction with a user interface object displayed on the display 340, that is, implements man-machine interaction. The sensor controller 372 may receive a signal from one or more sensors 350 and/or send a signal to one or more sensors 350.

The processor 380 is a control center of the terminal device 300, and is connected to all parts of the entire terminal device by using various interfaces and lines, and performs various functions of the terminal device 300 and data processing by running or executing the software program and/or the module that are/is stored in the memory 320 and invoking data stored in the memory 320, so as to perform overall monitoring on the terminal device. Optionally, the processor 380 may include one or more processing units. Preferably, the processor 380 may integrate an application processor and a modem processor. The application processor mainly processes an operating system, a user interface, an application program, and the like, and the modem processor mainly processes wireless communication. It may be understood that the modem processor may be not integrated into the processor 380.

The processor 380 is configured to: obtain a network search instruction that is used to instruct the terminal device to start searching for a network, search a network frequency band in a first network standard for an available network according to the network search instruction, and control the display 340 to display, to a user, the available network found in the network frequency band in the first network standard.

Optionally, the processor 380 is further configured to: search a network frequency band in a second network standard for an available network, and control the display 340 to display, to the user, the available network found in the network frequency band in the second network standard.

Optionally, the processor 380 is specifically configured to search the network frequency band in the first network standard for the available network in a pre-configured first time interval according to the network search instruction.

The terminal device 300 further includes the power supply 390 (for example, a battery) that supplies power to each part. Preferably, the power supply may be logically connected to the processor 380 by using a power management system, so as to manage functions such as charging, discharging, and power consumption by using the power management system.

Although not shown in the figure, the terminal device 300 may further include a camera, a Bluetooth module, and the like, and details are not described herein.

It should be understood that the terminal device 300 may be corresponding to a terminal device or an electronic device in the network search display method for a terminal device according to this embodiment of this application, and the terminal device 300 may include an entity unit configured to perform the method performed by the terminal device or the electronic device in the foregoing method. In addition, entity units in the terminal device 300 and the foregoing other operations and/or functions are separately used to implement a corresponding procedure of the foregoing method. For brevity, details are not described herein.

It should be further understood that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a central processing unit (Central Processing Unit, CPU), or the processor may be another general purpose processor, a digital signal processor (Digital Signal Processor, DSP), an application-specific integrated circuit (Application-Specific Integrated Circuit, ASIC), a field programmable gate array (Field Programmable Gate Array. FPGA) or another programmable logic device, a discrete gate or a transistor logic device, or a discrete hardware component. The processor may implement or perform methods, steps, and logical block diagrams that are disclosed in the embodiments of this application. The general purpose processor may be a microprocessor, or the processor may be any conventional processor or the like. The steps in the method disclosed with reference to the embodiments of this application may be directly performed by a hardware decoding processor, or may be performed by using a combination of hardware in a decoding processor and a software unit. The software unit may be located in a mature storage medium in the art, such as a random access memory, a flash memory, a read-only memory, a programmable read-only memory, an electrically erasable programmable memory, or a register. The storage medium is located in the memory, and a processor reads information from the memory and completes the steps in the foregoing methods in combination with hardware in the processor.

It should be further understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. According to a description that is used as an example instead of a limitation, many forms of RAMs are available, such as a static random access memory (Static RAM. SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the systems and methods described in this specification is intended to include but is not limited to these and any other proper types of memories.

It should further be understood that, the bus system may further include a power bus, a control bus, a status signal bus, and the like, in addition to a data bus. However, for clear description, various types of buses in the figure are marked as the bus system.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In an implementation process, steps in the foregoing methods can be implemented by using a hardware integrated logical circuit in the processor, or by using instructions in a form of software. The steps in the method for transmitting an uplink signal disclosed with reference to the embodiments of this application may be directly performed by a hardware processor, or may be performed by using a combination of hardware in a processor and a software unit. The software unit may be located in a mature storage medium in the art, such as a random access memory, a flash memory, a read-only memory, a programmable read-only memory, an electrically erasable programmable memory, or a register. The storage medium is located in the memory, and a processor reads information from the memory and completes the steps in the foregoing methods in combination with hardware in the processor. To avoid repetition, details are not described herein again.

This embodiment of this application further provides a computer readable storage medium, where the computer readable storage medium stores one or more programs, the one or more programs include an instruction, and when being executed by a portable electronic device that includes a plurality of application programs, the instruction enables the portable electronic device to perform the method in the embodiments/embodiment shown in FIG. 2 and/or FIG. 3.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A network search display method implemented by a terminal device, wherein the network search display method comprises:

obtaining a network search instruction for searching of a network;

determining a first network standard based on a priority of the first network standard, wherein the priority of the first network standard is a highest priority relative to a priority of a plurality of other network standards;

performing a first search of a first network frequency band of the first network standard for one or more first available networks according to the network search instruction, wherein the first network frequency band of the first network standard is a network frequency band supported in an area in which the terminal device is located;

displaying the one or more first available networks; and subsequent to displaying the one or more first available networks:

determining a second network standard based on a priority of the second network standards wherein the priority of the second network standard is a second highest priority relative to the priority of the other network standards and wherein eth second network standard is different than the first network standard;

performing a second search of a second network frequency band of the second network standard for one or more second available networks;

displaying, to a user, the one or more second available networks when the second search identifies the one or more second available networks; and notifying the user that no network is found in the second network frequency band of the second network standard when the second search does not identify any networks.

2. The network search display method of claim 1, wherein the first network standard is a fourth generation (4G) mobile communications technology standard and the second network standard is a third generation (3G) mobile communications technology standard.

3. The network search display method of claim 1, wherein performing the first search comprises searching a first set of frequencies of the first network frequency band within a pre-configured first time interval according to the network search instruction, wherein the pre-configured first time interval begins when the first search is initiated, wherein the network search display method further comprises storing at least one first available network found during the first search in the pre-configured first time interval when the pre-configured first time interval expires, wherein displaying the one or more first available networks comprises displaying at least one first available network when a pre-configured second time interval having a different duration than the pre-configured first time interval expires, and wherein the pre-configured second time interval begins when the first search is initiated.

4. A terminal device, comprising:
a display;
a memory configured to store a plurality of programming instructions; and
at least one processor coupled to the display and the memory, wherein the programming instructions, when executed by the at least one processor, cause the terminal device to:
obtain a network search instruction for searching of a network;
determine a first network standard based on a priority of the first network standard, wherein the priority of the first network standard is a highest priority relative to a priority of a plurality of other network standards;
perform a first search of a first network frequency band of the first network standard for one or more first available networks according to the network search instruction, wherein the first network frequency band of the first network standard is a network frequency band supported in an area in which the terminal device is located;
display, using the display, the one or more first available networks; and
subsequent to displaying the one or more first available networks:
determine a second network standard based on a priority of the second network standard, wherein the priority of the second network standard is a second highest priority relative to the priority of the other network standards, and wherein the second network standard is different than the first network standard;
perform a second search of a second network frequency band of the second network standard for one or more second available networks;
display, to a user and using the display, the one or more second available networks when the second search identifies the one or more second available networks; and
notify the user that no network is found in the second network frequency band of the second network standard when the second search does not identify any networks.

5. The terminal device of claim 4, wherein the first network standard is a fourth generation (4G) mobile communications technology standard and the second network standard is a third generation (3G) mobile communications technology standard.

6. The terminal device of claim 4, wherein the programming instructions, when executed by the at least one processor, further cause the terminal device to perform the first search by causing the terminal to search a first set of frequencies of the first network frequency band within a pre-configured first time interval according to the network search instruction, wherein the pre-configured first time interval begins when the first search is initiated, wherein the programming instructions further cause the terminal device to store at least one first available network found during the first search in the pre-configured first time interval when the pre-configured first time interval expires, wherein the programming instructions cause the terminal device to display the one or more first available networks by causing the terminal device to display at least one first available network when a pre-configured second time interval having a different duration than the pre-configured first time interval expires, and wherein the pre-configured second time interval begins when the first search is initiated.

7. A non-transitory computer-readable storage medium storing computer-readable instructions that, when executed by a processor of a terminal, cause the terminal to:
obtain a network search instruction for searching of a network;
determine a first network standard based on a priority of the first network standard, wherein the priority of the first network standard is a highest priority relative to a priority of a plurality of other network standards;
perform a first search of a first network frequency band of the first network standard for one or more available networks according to the network search instruction, wherein the first network frequency band of the first network standard is a network frequency band supported in an area in which the terminal is located, and wherein the first network standard is a network standard with a highest priority;
display the one or more first available networks; and
subsequent to displaying the one or more first available networks:
determine a second network standard based on a priority of the second network standard, wherein the priority of the second network standard is a second highest priority relative to the priority of the other network standards, and wherein the second network standard is different than the first network standard;
perform a second search of a second network frequency band of the second network standard for one or more second available networks;
display, to a user and using the display, the one or more second available networks when the second search identifies the one or more second available networks; and notify the user that no network is found in the second network frequency band of the second network standard when the second search does not identify any networks.

8. The non-transitory computer-readable storage medium of claim 7, wherein the first network standard is a fourth generation (4G) mobile communications technology standard and the second network standard is a third generation (3G) mobile communications technology standard.

9. The non-transitory computer-readable storage medium of claim 7, wherein the computer-readable instructions further cause the terminal to perform the first search by causing the terminal to search a first set of frequencies of the first network frequency band within a pre-configured first time interval according to the network search instruction, wherein the pre-configured first time interval begins when the first search is initiated, wherein the computer-readable instructions further cause the terminal to store at least one first available network found during the first search in the pre-configured first time interval when the pre-configured first time interval expires, wherein the computer-readable instructions further cause the terminal to display the one or more first available networks by causing the terminal to display the at least one first available network when a pre-configured second time interval having a different duration than the pre-configured first time interval expires, and wherein the pre-configured second time interval begins when the first search is initiated.

10. The network search display method of claim 1, wherein obtaining the network search instruction comprises disabling an automatic search option when the terminal device does not include an option to select a manual search.

11. The network search display method of claim 1, wherein the first network standard is a third generation (3G) mobile communications technology standard and the second network standard is a second generation (2G) mobile communications technology standard.

12. The network search display method of claim 3, wherein performing the first search further comprises searching a second set of frequencies of the first network frequency band during a pre-configured third time interval according to the network search instruction, and wherein the pre-configured third time interval begins when the pre-configured first time interval ends and is a same duration as the pre-configured first time interval.

13. The network search display method of claim 12, wherein the pre-configured third time interval ends after the pre-configured second time interval ends.

14. The terminal device of claim 4, wherein the programming instructions further cause the terminal device to disable an automatic search option when the terminal device does not include an option to select a manual search.

15. The terminal device of claim 4, wherein the first network standard is a third generation (3G) mobile communications technology standard and the second network standard is a second generation (2G) mobile communications technology standard.

16. The terminal device of claim 6, wherein the programming instructions further cause the terminal device to perform the first search by causing the terminal device to search a second set of frequencies of the first network frequency band during a pre-configured third time interval according to the network search instruction, and wherein the pre-configured third time interval begins when the pre-configured first time interval ends and is a same duration as the pre-configured first time interval.

17. The terminal device of claim 16, wherein the pre-configured third time interval ends after the pre-configured second time interval ends.

18. The non-transitory computer-readable storage medium of claim 7, wherein the computer-readable instructions further cause the terminal to disable an automatic search option when the terminal device does not include an option to select a manual search.

19. The non-transitory computer-readable storage medium of claim 7, wherein the first network standard is a third generation (3G) mobile communications technology standard and the second network standard is a second generation (2G) mobile communications technology standard.

20. The non-transitory computer-readable storage medium of claim 9, wherein the computer-readable instructions further cause the terminal to perform the first search by causing the terminal device to search a second set of frequencies of the first network frequency band during a pre-configured third time interval according to the network search instruction, and wherein the pre-configured third time interval begins when the pre-configured first time interval ends, is a same duration as the pre-configured first time interval, and ends after the pre-configured second time interval ends.

* * * * *

UNITED STATES PATENT AND TRADEMARK OFFICE
CERTIFICATE OF CORRECTION

PATENT NO. : 11,172,433 B2
APPLICATION NO. : 16/341594
DATED : November 9, 2021
INVENTOR(S) : Xiaojian Liu et al.

Page 1 of 1

It is certified that error appears in the above-identified patent and that said Letters Patent is hereby corrected as shown below:

In the Claims

Claim 1, Column 16, Line 66: "wherein eth second" should read "wherein the second"

Signed and Sealed this
Eleventh Day of January, 2022

Drew Hirshfeld
*Performing the Functions and Duties of the
Under Secretary of Commerce for Intellectual Property and
Director of the United States Patent and Trademark Office*